United States Patent [19]

Tinholt

[11] 4,046,239
[45] Sept. 6, 1977

[54] VISCOUS DRIVEN OVERRUNNING CLUTCH

[75] Inventor: Thomas H. Tinholt, Marshall, Mich.

[73] Assignee: Eaton Corporation, Cleveland, Ohio

[21] Appl. No.: 683,852

[22] Filed: May 6, 1976

[51] Int. Cl.² ............................................. F16D 31/00
[52] U.S. Cl. .................................................. 192/58 B
[58] Field of Search .................. 192/58 A, 58 B, 58 R

[56] References Cited

U.S. PATENT DOCUMENTS

| | | | |
|---|---|---|---|
| 3,259,221 | 7/1966 | Godfrey | 192/58 B |
| 3,263,783 | 8/1966 | Sutaruk | 192/58 B |
| 3,587,801 | 6/1971 | Riner | 192/58 B |

Primary Examiner—Edgar W. Geoghegan
Attorney, Agent, or Firm—Teagno & Toddy

[57] ABSTRACT

A viscous shear overrunning clutch having a housing and circular member is disclosed which provides a driving force in one direction and an overrunning clutch when the relative angular velocities of the clutch and housing are reversed. The design includes a housing having a circular member mounted therein. In one embodiment, spaced radially extending passageways are circumferentially defined in the circular member and allow fluid communication between a working chamber and a reservoir. Flow directing means are located on the outer periphery of the circular member adjacent the end of the radially extending passages to create pressures within the passages to move fluid between the working chamber and reservoir in response to differences in angular velocity between the housing member and circular member.

7 Claims, 3 Drawing Figures

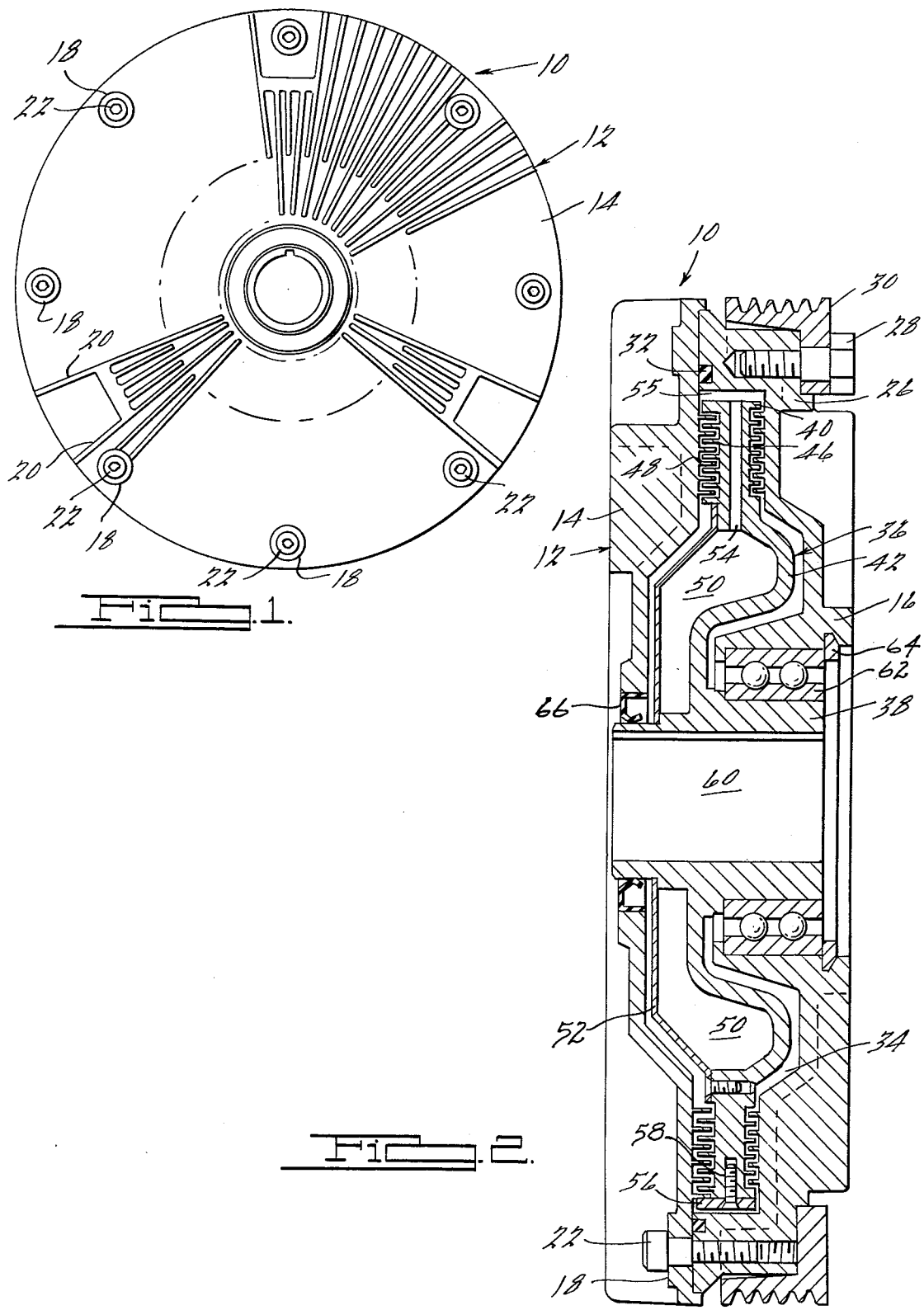

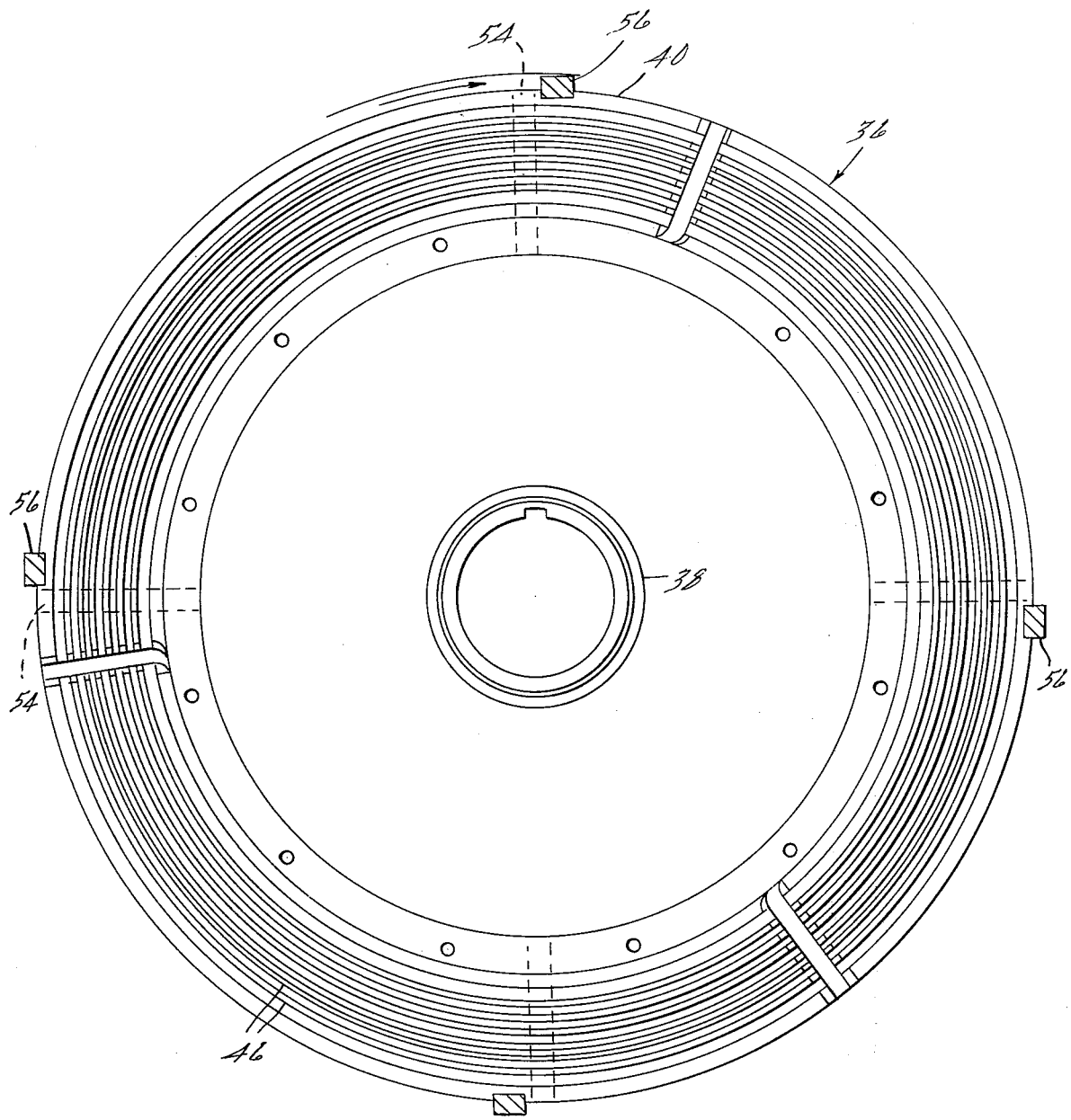

VISCOUS DRIVEN OVERRUNNING CLUTCH

BACKGROUND OF THE INVENTION

1. Field of the Invention

In one aspect this invention relates to viscous drive couplings. In another aspect, this invention relates to overrunning clutches.

2. Description of the Prior Art

The prior art contains various mechanical overrunning clutches. The overrunning clutches presently available are generally expensive due to their complex mechanical structure. Also, the clutches are difficult to lubricate properly which shortens their life expectancy. A further problem is the mechanical clutches vulnerability to torque spikes. When a sudden increase in torque is applied to a mechanical clutch the clutch can be destroyed.

Viscous couplings provide a clutch mechanism having a simple structure. One example of a viscous coupling is shown in U.S. Pat. No. 3,329,246. This viscous shear coupling has two members wherein torque is transmitted from one member to the other member by the shear characteristics of a viscous fluid.

Basically this device and other viscous couplings are designed to transmit torque from a driven member to a nondriven member regardless of the direction the driven member rotates.

Where the clutch is used in a system which requires driving force only under certain conditions the clutch can act as a power drain. For example, if the clutch is used to transmit power from an engine to a blower it should not consume power during the starting cycle but begin to transmit power to the blower as the engine speed increases.

SUMMARY OF THE INVENTION

It is an object of this invention to provide a viscous overrunning clutch which transmits torque in only one rotational direction.

It is a further object of this invention to provide a viscous shear overrunning coupling with a simple, long lived structure.

In general the coupling of this invention will have a housing defining a working chamber. The chamber has a circular member rotatably mounted therein. One of the members has a reservoir therein which can hold a quantity of viscous fluid. The housing and circular member have spaced apart surfaces which together define a shear space which can contain viscous fluid shear medium.

Viscous medium between the surfaces provides a shear-type drive suitable for transmitting torque between the housing member and circular member. A plurality of circumferentially spaced radially extending passages are defined in the circular member to communicate fluid between the working chamber and reservoir.

As a feature of this invention flow directing means are located on one of the members extending into a portion of the working chamber. The flow directing means are adapted to create a pressure in the working chamber adjacent the flow directing means. In one embodiment, when the circular member rotates at an angular velocity greater than the housing, fluid is drawn out of the reservoir allowing more torque to be transmitted to the housing by viscous shear. When the housing rotates faster than the circular member, fluid is forced into the reservoir thereby decreasing the torque transmitted to the housing by viscous shear. As fluid is pumped into the reservoir the coupling is effectively disengaged.

BRIEF DESCRIPTION OF THE DRAWINGS

In the accompanying drawing:

FIG. 1 is a front view of one embodiment of the invention;

FIG. 2 is a sectional view of FIG. 1; and

FIG. 3 is a front view of the circular member of FIG. 2 showing the flow directing means in greater detail.

DESCRIPTION OF PREFERRED EMBODIMENTS

In the accompanying drawings a viscous fluid clutch is denoted generally as 10. The clutch shown has a cast metal housing 12 including a front housing member 14 and a rear housing member 16. The front housing 14 shown in FIG. 1 is formed with eight radially disposed bosses 18 and a plurality of cooling fins 20. The bosses 18 are machined and drilled to accept bolts 22 which secure the front housing member 14 to the rear housing member 16. The rear housing member 16 has bosses 26 which are machined to accept a second series of bolts 28 which hold a belt pulley 30 to the rear housing member. The front and rear members are sealed by a sealing ring 32 to form a liquid tight chamber 34 within the housing 12.

A circular member 36 is mounted within the liquid tight chamber 34 of the housing 12. The circular member 36 comprises in part a hub portion 38, an annular rim portion 40, and a spoke member 42 connecting the hub and rim. The rim portion 40 has a ribbed portion defined by a plurality of radially spaced, concentric rings 46 which project axially from both surfaces of the rim. The front and rear housing members have complimentary concentric rings 48 which project axially from the housing members between the rings 46. The concentric rings of the housing and circular member provide a plurality of interdigitated rings forming a labyrinthian structure through which a viscous fluid, commonly called a fluid shear medium, can move.

The circular member 36 has a reservoir 50 defined by the spoke member 42 and a cover member 52. The reservoir 50 is in fluid communication with the labyrinthian structure or shear space by means of ports 54 which extend radially through the annular rim portion of the circular member 36.

Small ramped blocks 56 are attached to the periphery of the circular member 36 adjacent the ports 54 and project into an annular chamber 55. The chamber 55 can be of various sizes, however, a chamber which is larger than that normally used for viscous fan drives provides a low torque overrunning clutch. The blocks 56 act as pumping members. When the housing 12 is moving faster than the circular member 36 the blocks 56 force or pump fluid into the ports 54 and thereby the reservoir 50. As shown the blocks 56 are attached to the periphery of the circular member 36 by screws 58. In practice, the blocks can be attached by welding or other permanent means. The blocks could also be cast or formed as an integral part of the circular member. The blocks shown have a first substantially radial face and a second face which is disposed at an oblique angle to the radii of the circular member and represent one embodiment of the invention. The structure shown builds a film of fluid on the ends of the blocks to prevent rubbing and provide a self-lubricating structure. Other pumping means could also be used to achieve the desired pumping function.

The circular member 36 has an axial bore 60 therethrough which is adapted to receive a shaft. The shaft would support the clutch mechanism 10 and provide a means for receiving or transmitting power via the clutch.

The housing 12 is rotatably mounted to the hub 38 of the circular member 36 by means of a bearing 62. The bearing 62 is shown as a double row ball bearing and is held in place by a retaining ring 64 and allows free relative rotation between the housing 12 and circular member 36.

At the front of the housing a seal 66 pressed between the front housing member 14 and a foreward extending portion of the hub 38 makes the chamber within the housing fluid tight.

OPERATION OF THE ILLUSTRATED EMBODIMENT

The operation of the clutch 10 is described as it might be used in a hot gas engine. When starting a hot gas engine it is necessary to activate a blower to push air into a combustion chamber. This is normally accomplished by means of a starter motor. After the engine has begun to operate the power for the blower is furnished by the engine. When used in a hot gas engine the clutch of this invention can be mounted on a shaft which receives power from the engine and will turn the circular member while the engine is operating.

During starting the starter motor would turn the blower and the housing by means of a vee belt drive which passes over the pulley 30. The pumping means are adapted so that they pump viscous fluid out of the labyrinth when the housing is rotating faster than the circular member. Therefore, in a starting mode the viscous clutch will apply a negligible amount of torque to the circular member. This provides a clutch with only a small power drain during starting.

As the engine speed increases, the angular speed of the circular member 36 also increases. The pumping action of the blocks 56 will begin to pump liquid from the reservoir 50 into the working chamber 55. The viscous fluid in the working chamber transmits rotational forces from the circular member to the housing and pulley providing power to the blower replacing the power furnished by the starting motor. The pumping means will pump fluid from the reservoir until the speed of the housing approximates the speed of the circular member and the starting motor can be disengaged.

The coupling can be used with either member being the driven member; however, it is preferable that the member which is stationary when the clutch is in the overrunning mode contain the reservoir. This configuration permits faster pumping for faster engagement and disengagement.

It is apparent from the foregoing discription that the new overrunning clutch of this invention has several advantages. It is resistant to damage by torque spikes, the viscous fluid absorbing the spikes by increased shearing of the fluid. Since there is no mechanical connection between the members, the clutch of this invention will dampen vibrations applied to one of the members.

Various modifications and alterations of this invention will become obvious to those skilled in the art from the foregoing description. It is understood that this invention is not limited to the illustrative embodiment described above.

What is claimed is:

1. A viscous drive coupling comprising:
   a housing member defining a working chamber;
   a circular member rotatably mounted within the working chamber;
   opposed surfaces located on the housing member and circular member and defining a shear space therebetween;
   a fluid shear means within the coupling to cooperate with the opposed surfaces to provide a fluid shear-type drive between the housing member and circular member;
   a fluid reservoir located within one of the members and in fluid communication with the shear space;
   flow directing means on one of the members adapted to draw fluid out of the reservoir into the working chamber when the angular velocity of the reservoir containing member in one rotating direction exceeds the angular velocity of the other member in the same direction and to pump fluid into the reservoir when the angular velocity of the reservoir containing member in the one rotating direction is less than the angular velocity of the other member in the same direction.

2. The coupling according to claim 1 wherein the fluid directing means is on the reservoir containing member.

3. The apparatus of claim 1 where the circular member has a plurality of spaced radially extending passages defined in the circular member and in fluid communication with the working chamber and the reservoir, the passages being located adjacent the flow directing means.

4. The apparatus of claim 1 where the circular member is the driven member and the reservoir is defined within the circular member.

5. The apparatus of claim 1 where the flow directing means comprises ramped blocks having a first face which is substantially radial and a second face which is disposed at an oblique angle to the radii of the circular member, the ramped blocks being located near a radially extending passage in the circular member so as to direct fluid into the passage and thereby the reservoir when the housing is rotating faster than the circular member.

6. A fluid coupling comprising:
   a housing member defining a working chamber;
   a circular member mounted for rotation in the working chamber and defining an annular reservoir;
   spaced apart opposed surfaces located on the housing member and circular member which define therebetween a shear space;
   a fluid shear medium in the shear space and the reservoir, and cooperable with the spaced apart opposed surfaces to provide a fluid shear-type drive between the members;
   a plurality of circumferentially spaced radially extending passages defined in the circular member, the passages being in fluid communication with the working chamber and the reservoir; and
   flow directing means on the outer periphery of the circular member adjacent the passages for creating a pressure in the working chamber adjacent the flow-directing means to draw the fluid out of the reservoir into the working chamber via the passages when the circular member is rotating at an angular velocity greater than the angular velocity of the housing member and for creating a pressure in the working chamber adjacent the means to force fluid from the working chamber into the reservoir via the passages when the housing member is rotating at an angular velocity greater than the angular velocity of the circular member.

7. The fluid coupling of claim 6 wherein the flow directing means comprises: ramped block having a first face which is substantially radial and a second face which is disposed at an oblique angle to the radii of the circular member, the ramped blocks being located near the radially extending passage in the circular member so as to direct fluid into the passage and thereby the reservoir when the housing is rotating faster than the circular member.

* * * * *